(12) United States Patent
Shiraishi et al.

(10) Patent No.: US 7,489,424 B2
(45) Date of Patent: Feb. 10, 2009

(54) DEVICE FOR PREVENTING IMAGE QUALITY REDUCTION CAUSED BY INCIDENTAL LIGHT

(75) Inventors: Kenichi Shiraishi, Nara (JP); Hideyuki Miyake, Soraku-gun (JP); Takashi Suda, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1013 days.

(21) Appl. No.: 10/659,270

(22) Filed: Sep. 11, 2003

(65) Prior Publication Data
US 2004/0051914 A1    Mar. 18, 2004

(30) Foreign Application Priority Data
Sep. 18, 2002  (JP) ............... P2002-271660

(51) Int. Cl.
*H04N 1/04* (2006.01)
*H04N 1/00* (2006.01)

(52) U.S. Cl. ............ 358/474; 358/498; 358/1.6

(58) Field of Classification Search ........... 358/509, 358/494, 474, 498, 1.6, 1.1, 475, 480, 482, 358/486, 487, 488, 489, 490, 491, 493, 496, 358/497, 500, 501, 505, 506, 510, 514, 400, 358/401, 495; 382/318, 319, 312, 315, 321; 399/1, 8, 361, 363, 365, 367, 392; 347/2, 347/3, 5, 14, 23, 20, 40; 271/3.14, 8.1, 278
See application file for complete search history.

(56) References Cited

U.S. PATENT DOCUMENTS 3,981,575 A  *  9/1976  Tanaka et al. ............... 355/1
5,548,411 A      8/1996  Sato et al.

FOREIGN PATENT DOCUMENTS

| JP | 5-37743 A  |   | 2/1993 |
|----|------------|---|--------|
| JP | 05037743 A | * | 2/1993 |
| JP | 8-336004 A |   | 12/1996 |
| JP | 10-200673  |   | 7/1998 |
| JP | 11-41408 A |   | 2/1999 |
| JP | 11041408 A | * | 2/1999 |
| JP | 11-164072 A|   | 6/1999 |
| JP | 11-261761 A|   | 9/1999 |

OTHER PUBLICATIONS

European Search Report completed Nov. 3, 2003 in corresponding EP application No. 03021053.

* cited by examiner

*Primary Examiner*—Dov Popovici
(74) *Attorney, Agent, or Firm*—Nixon & Vanderhye, P.C.

(57) ABSTRACT

An image reading device is provided with a guide member having a light-blocking portion with its upper surface positioned above an extended surface of a reading surface of an optical reader. The device is also provided with a slant surface between the reading surface of the optical reader and the light-blocking portion. The device is further provided with upper guide surfaces facing the light-blocking portion and the slant surface respectively, at a predetermined distance.

6 Claims, 3 Drawing Sheets

PRIOR ART

DEVICE FOR PREVENTING IMAGE QUALITY REDUCTION CAUSED BY INCIDENTAL LIGHT

This Nonprovisional application claims priority under 35 U.S.C. § 119(a) on Patent Application No. 2002-271660 filed in Japan on Sep. 18, 2002, the entire contents of which are hereby incorporated by reference.

BACKGROUND

1. Technical Field

The present invention relates to an image reading device which reads an image of an original by projecting light to the original.

2. Description of Related Art

There are facsimile machines provided with an image reading device which reads an image of an original by projecting light to the original while transporting it and detecting the reflected light. FIG. 2 is a cross-sectional view of an image reading device and an original eject portion of a conventional facsimile machine.

In the image reading device as shown in FIG. 2, an original guide member 21 forms a flat guide surface 21A leading from an image sensor 19 to an original eject slot 20, with an upper edge 20A of the slot 20 positioned above the guide surface 21A.

The image reading device has the following problem. External light such as sunlight or electric light is reflected by a desk surface or the like, and the reflected light enters the interior of a casing of the facsimile machine through the original eject slot 20 to be directly incident on a reading surface of the image sensor 19. This results in reduced image reading quality. To solve the problem, there has been an attempt to attach a plastic film to a casing for covering an original eject slot. However, this construction may cause further problems: increased production costs involved by increased component parts, and lowered original ejecting performance.

There has been thus proposed an image reading device in which an original guide surface formed by an original guide member leading from an image sensor to an original eject slot, and the original eject slot, are positioned differently from those in the foregoing conventional image reading device, as described in Japan Laid-open Patent Publication No. H10-200673.

FIG. 3 is an enlarged view of a relevant part of the image reading device as disclosed in Japanese Laid-open Patent Publication No. 10-200673. In the image reading device, as illustrated in FIG. 3, an original guide member 27 for guiding an original is provided with a step portion 24 between an image sensor 22 and an original eject slot 26. More specifically, the original guide member 27 is formed by a first guide surface 25 and a second guide surface 23 which is raised by the height of the step portion 24. The height of the step portion 24 is set such that an upper edge 26A of the original eject slot 26 is positioned below an extended plane 23A of the second guide surface 23.

The Publication argues that this arrangement prevents the incidence of the external light on a reading surface of the image sensor 22 without involving increased component parts and lowered original ejecting performance.

In the image reading device, however, there is a certain distance between the original eject slot 26 and the image sensor 22, and incoming external light is reflected there. Consequently, lowering of image reading quality of the image sensor 22 caused by the incident external light cannot be resolved sufficiently. It is possible to prevent the reflection and refraction by blackening the original guide member 27. If the original guide member 27 is exposed to the exterior, however, design restrictions make it difficult to change only the color of the original guide member 27 arbitrarily.

Moreover, the image reading device has a large opening of the original eject slot 26 and a wide space above the image sensor 22 and the original guide member 27. Thus, the incoming light through the original eject slot 26 is reflected by inner members of the device, causing the lowering of image reading quality of the image sensor 22.

SUMMARY

To solve the foregoing problems, an object of example embodiments is to provide an image reading device which prevents lowering of image reading quality caused by incident external light, without involving increase in production costs or reduction in original ejecting performance, and without design restrictions.

The image reading device of example embodiments includes:
- an optical reader for reading an original in a main scanning direction;
- a transporter for transporting the original in a sub scanning direction; and
- a guide member for guiding the original read by the optical reader to an original eject slot, wherein the guide member is provided with a light-blocking portion with its upper surface positioned above an extended plane of a reading surface of the optical reader.

This configuration allows incoming external light through the original eject slot to be blocked by the light-blocking portion, thereby preventing direct incidence of the external light on the reading surface of the optical reader. As a result, it is possible to prevent image reading quality of the optical reader from being reduced by the incident external light, without involving increased production costs nor reduced original ejecting performance.

DESCRIPTION OF EXAMPLE EMBODIMENTS

Figure 1:
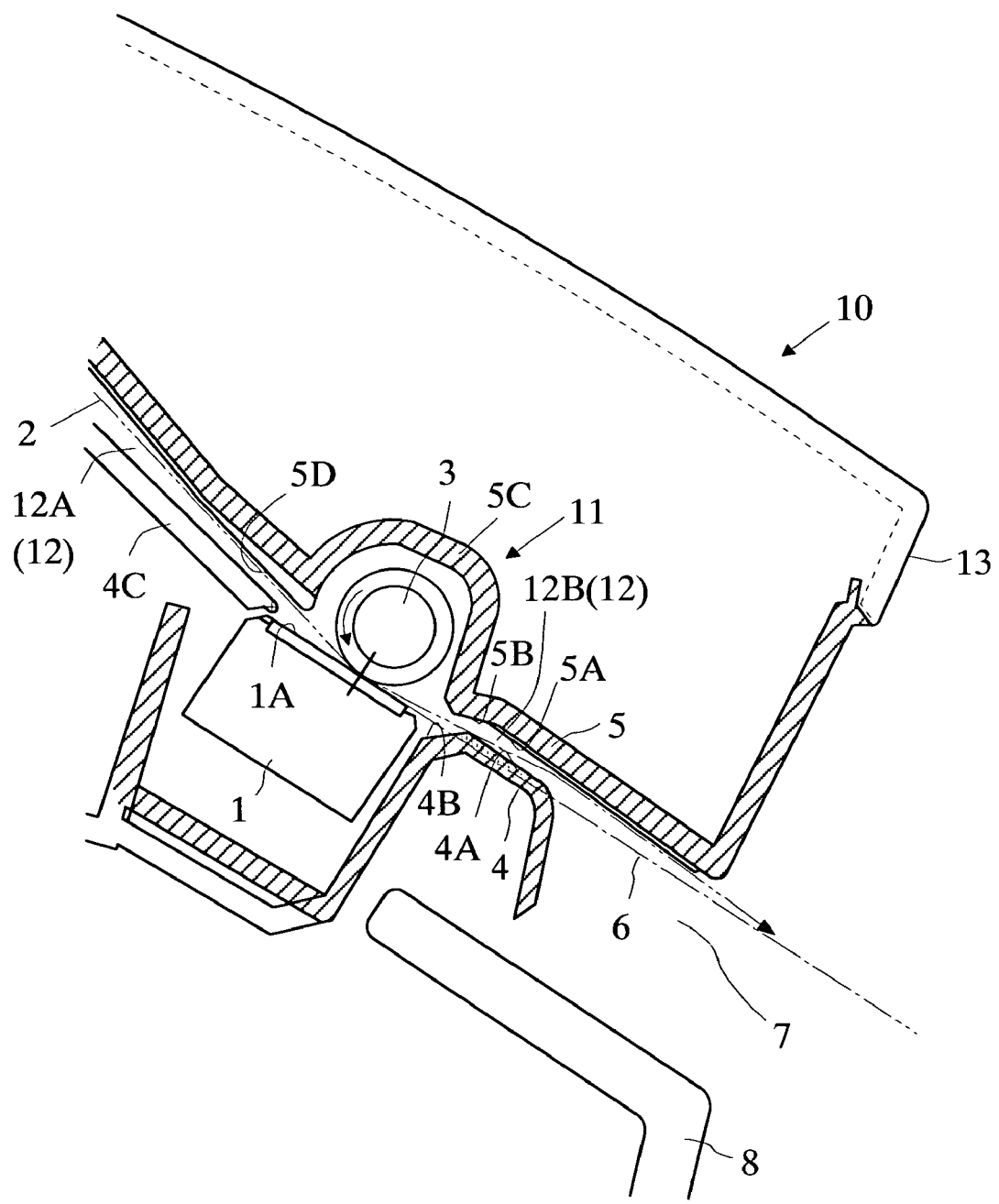
FIG. 1 is a cross-sectional view showing a configuration of an image reading device according to an example embodiment.
Figure 2:
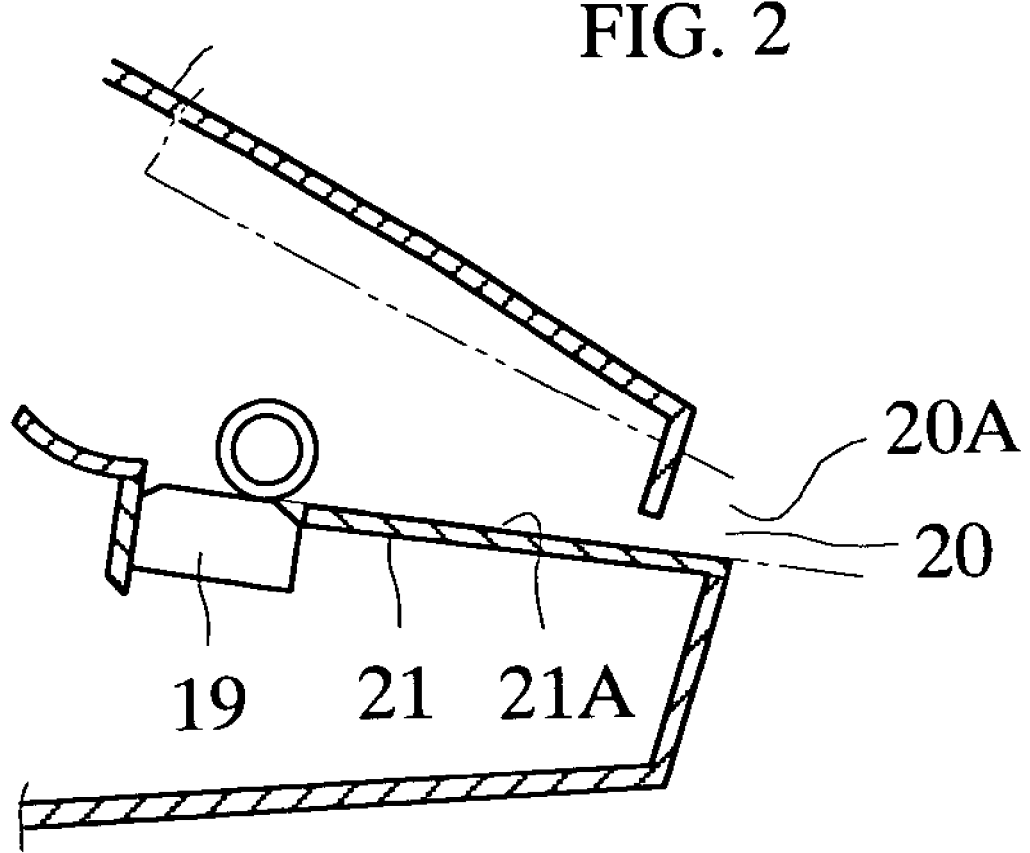
FIG. 2 is a cross-sectional view showing an image reading device and an original eject portion of a conventional facsimile machine.
Figure 3:
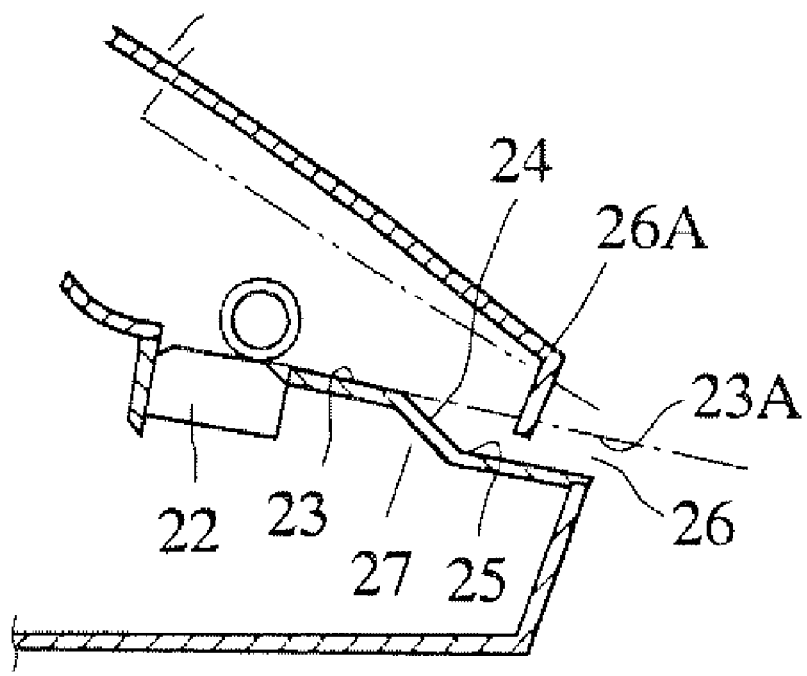
FIG. 3 is an enlarged view of the relevant part of the reading apparatus as disclosed in Japanese Laid-open Patent Publication No. 10-200673.

A preferred embodiment will now be described with reference to the accompanying drawings. FIG. 1 is a cross-sectional view of a configuration of an image reading device according to an example embodiment. In the embodiment as shown in FIG. 1, the image reading device is applied to a facsimile machine.

In a facsimile machine 10 an original transport path 12 is formed on a slant. In FIG. 1 the original transport path 12 is slanting from the upper left to the lower right at a predetermined angle. The transport path 12 is formed by a lower guide member 4 and an upper guide member 5. Arranged at a point along the transport path 12 is an image reading section 11 including an image sensor 1 and a transport roller 3. An end of the transport path 12 serves as an original eject slot 7. A tray 8 is provided below the original eject slot 7.

Hereinafter referred to as a transport path 12A is an upstream portion of the transport path 12 in an original transport direction with reference to the image reading section, and as a transport path 12B is a downstream portion of the same. Paper of size such as B5, B4, A4, or A3, for example, shall be used as an original in the facsimile machine 10.

The transport path 12A is formed by a lower guide surface 4C and an upper guide surface 5D which face each other at a predetermined distance (a distance narrow enough for an original to pass through without being jammed).

The image sensor 1 is arranged so that its reading surface (upper surface) 1A has a slant angle approximately equal to that of the transport path 12A. The image sensor 1 reads an image of an original in a direction perpendicular to the original transport direction (a main scanning direction).

The transport roller 3 is in contact with the reading surface 1A of the image sensor 1. When the image sensor 1 reads an original 2 (indicated by a long-dashed double-short- dashed line in the figure), the transport roller 3 transports the original 2 line by line in the original transport direction (a sub scanning direction), with the original 2 nipped between the roller 3 and the reading surface 1A. In this operation, the transport roller 3 is rotated counterclockwise in the figure by a power source (not shown). Around the transport roller 3, a cover surface 5C is formed at a predetermined distance from the surface of the transport roller 3. The distance should advisably be set similar to that between the lower guide surface 4C and the upper guide surface 5D in the transport path 12. The cover surface 5C intersects with the upper guide surface 5A at an intersection.

The transport path 12B is formed by (i) a lower guide surface 4A and a lower slant surface 4B and (ii) an upper guide surface 5A and an upper slant surface 5B, with the lower and upper surfaces facing each other at a predetermined distance (a distance narrow enough for an original to pass through without being jammed). The transport path 12B slants, generally at an angle approximately equal to that of the reading surface 1A, but partially at a different angle. More specifically, the lower slant surface 4B is formed just downstream from the image sensor 1 in the original transport direction, so as to be at an oblique, upward angle with an extended plane 6 (indicated by a long-dashed short-dashed line) of the reading surface 1A of the image sensor 1. The lower guide surface 4A is formed downstream from the lower slant surface 4B in the original transport direction and intersects lower slant surface 4B at an intersection. The lower guide surface 4A, and a rear end of the lower slant surface 4B are formed so as to be positioned above the extended plane 6.

The upper slant surface 5B may be provided at the intersection of the cover surface 5C and the upper guide surface 5A. The upper slant surface 5B may be formed as an upward slant that is adjacent the lower slant surface 4B and that is at least partially provided between the reading surface and the intersection of the lower slant surface 4B and the lower guide surface 4A. The upper slant surface 5B may be formed to intersect the portion of the upper guide surface 5A that is substantially parallel to the lower guide surface 4A at an intersection that is adjacent the intersection of the lower slant surface 4B and the lower guide surface 4A. The upper slant surface 5B may also be formed to have a slant angle either similar to that of the lower slant surface 4B or, as shown in FIG. 1, more gradual than the same. In addition, a downward slant surface may be provided between the upper slant surface 5B and the transport roller 3. The downward slant may intersect the upper slant surface 5B at an intersection. The intersection of the downward slant and the upper slant surface 5B nearly intersects an extended plane of the lower guide surface 4A.

In the facsimile machine 10, an image of the original 2 is read as follows. The original 2, when put in an original insert slot (not shown) of the facsimile machine 10, is transported through the original transport path 12A to a space between the reading surface 1A of the image sensor 1 and the transport roller 3. In this transport, regulation of the original transport direction by the lower guide surface 4C and the upper guide surface 5D ensures that the original 2 is transported to the space between the reading surface 1A and the transport roller 3, even when its front end is curled.

Subsequently, the original 2 is nipped between the reading surface 1A and the transport roller 3, and has its image read line by line by the image sensor 1 while being transported by the transport roller 3. At this point the lower guide surface 4A in the transport path 12B functions as a light-blocking portion which prevents external light entering through the original eject slot 7 from entering the reading surface 1A directly. This is because the lower guide surface 4A is positioned above the extended plane 6 of the reading surface 1A, as described above.

After the image has been read, the original 2 is transported through the transport path 12B to be ejected onto the tray 8. In the transport, since the lower slant surface 4B slants obliquely upward, the original 2 is transported from the lower guide surface 4A to the original eject slot 7 without paper jam occurring. Also, control of the original transport direction by the upper guide surface 5A and the upper slant surface 5B ensures that the original 2 is ejected through the original eject slot 7 without being jammed in a casing 13, even when its front end is curled.

The distance in the transport path 12 (the transport paths 12A and 12B), and the distance between the transport roller 3 and the cover surface 5C are set to a predetermined distance (a distance narrow enough for an original to pass through without a paper jam). If external light is incident through the original eject slot 7, this setting prevents the incident light from being reflected inside the facsimile machine 10 and entering the reading surface 1A of the image sensor 1.

As described above, example embodiments provide the following advantages.

The light-blocking portion prevents incident external light through the original eject slot from entering the reading surface directly. Thus, decrease in image-reading quality is prevented.

The upper and lower slant surfaces provided between the image reading surface and the light-blocking portion allows smooth transport of an original. As a result, paper jams can be prevented.

The upper guide surface, as well as regulating the original transport direction, restricts the distance in the transport path. Consequently, the incident external light through the original eject slot is prevented from being reflected inside the facsimile machine and entering the optical reader.

The cover surface restricts the space around the transporter so that it is as narrow as the width of the original transport path. As a result, the incident external light through the original eject slot is prevented from being reflected around the transporter and entering the optical reader.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image reading device comprising:
   an optical reader for reading an original in a main scanning direction; said optical reader comprising a reading surface;
   a transporter for transporting the original in a sub scanning direction; and
   a transport path configured to guide, in an original transport direction, the original to an original eject slot, wherein the transport path comprises a lower guide surface and an upper guide surface, said lower guide surface also serving as a light-blocking portion, and wherein at least a portion of the lower guide surface is positioned above an extended plane of the reading surface of the optical reader;
   a first slant surface provided between the reading surface of the optical reader and the light-blocking portion;
   a cover surface provided around a substantial portion of a periphery of the transporter in such a manner as to face the transporter;
   wherein the transport path is arranged at a slant angle;
   wherein said transport path comprises a second slant surface adjacent said first slant surface;
   wherein the optical reader is arranged such that the reading surface has a slant angle approximately equal to that of the transport path, but partially at a different angle;
   wherein the second slant surface is an upward slant that may be formed to have a slant angle similar to a slant angle of the first slant surface and/or more gradual than the slant angle of the first slant surface;
   wherein, provided between said upper guide surface and said lower guide surface, is a predetermined distance that is narrow enough for an original to pass through without a paper jam;
   wherein, provided between the transporter and the cover surface, is a predetermined distance that is narrow enough for an original to pass through without a paper jam;
   wherein, provided between said upper guide surface and said lower guide surface, is a predetermined distance that prevents light incident through the original eject slot from being reflected inside the image reading device and entering the reading surface;
   wherein, provided between the transporter and the cover surface, is a predetermined distance that prevents light incident through the original eject slot from being reflected inside the image reading device and entering the reading surface;
   wherein the upper guide surface is configured to regulate the original transport direction and to prevent incident external light through the original eject slot from being reflected inside the image reading device and entering the optical reader;
   wherein the first slant surface intersects with the lower guide surface at an intersection;
   wherein said second slant surface is at least partially provided between the reading surface and the intersection of the first slant surface and the lower guide surface;
   wherein the cover surface intersects with the upper guide surface at an intersection;
   where said second slant surface is provided at the intersection of the cover surface and the upper guide surface;
   wherein a downward slant surface is provided between the second slant surface and the transporter;
   wherein a portion of the upper guide surface is substantially parallel to the lower guide surface at a point that is adjacent to the intersection of the first slant surface and the lower guide surface;
   wherein said second slant surface intersects said portion of the upper guide surface that is substantially parallel to the lower guide surface;
   wherein an intersection of the downward slant surface and the second slant surface nearly intersects an extended plane of the lower guide surface.

2. The image reading device of claim 1, wherein downstream from the optical reader the transport path comprises plural non-planar surfaces, the lower guide surface forming at least one of the plural non-planar surfaces.

3. The image reading device according to claim 1, wherein the upper guide surface faces the light-blocking portion at a predetermined distance.

4. The image reading device according to claim 3, wherein the second slant surface faces the first slant surface at a predetermined distance.

5. An image reading device comprising:
   an optical reader configured to read an original in a main scanning direction, the optical reader including a reading surface inclined toward a sub scanning direction;
   a transporter configured to transport the original in the sub scanning direction;
   upper and lower guide members configured to guide the original, in an original transport direction, to an original eject slot, the upper and lower guide members also configured to define an original transport path inclined toward the sub scanning direction;
   wherein the lower guide member comprises a light-blocking portion configured to block direct incidence of external light through the original transport path on the reading surface of the optical reader;
   wherein at least a portion of the lower guide member is positioned above an extended plane of the reading surface of the optical reader;
   a first slant surface provided between the reading surface of the optical reader and the light-blocking portion;
   a cover surface provided around a substantial portion of a periphery of the transporter in such a manner as to face the transporter;
   wherein the transport path is arranged at a slant angle;
   wherein said transport path comprises a second slant surface adjacent said first slant surface;
   wherein the optical reader is arranged such that the reading surface has a slant angle approximately equal to that of the transport path, but partially at a different angle;
   wherein the second slant surface is an upward slant that may be formed to have a slant angle similar to a slant angle of the first slant surface and/or more gradual than the slant angle of the first slant surface;
   wherein, provided between said upper guide member and said lower guide member, is a predetermined distance that is narrow enough for an original to pass through without a paper jam;
   wherein, provided between the transporter and the cover surface, is a predetermined distance that is narrow enough for an original to pass through without a paper jam;
   wherein, provided between said upper guide member and said lower guide member, is a predetermined distance that prevents light incident through the original eject slot from being reflected inside the image reading device and entering the reading surface;

wherein, provided between the transporter and the cover surface, is a predetermined distance that prevents light incident through the original eject slot from being reflected inside the image reading device and entering the reading surface;

wherein the upper guide member is configured to regulate the original transport direction and to prevent incident external light through the original eject slot from being reflected inside the image reading device and entering the optical reader;

wherein the first slant surface intersects with a lower guide surface of the lower guide member at an intersection;

wherein said second slant surface is at least partially provided between the reading surface and the intersection of the first slant surface and said lower guide surface of the lower guide member;

wherein the cover surface intersects with an upper guide surface of the upper guide member at an intersection;

where said second slant surface is provided at the intersection of the cover surface and said upper guide surface of the upper guide member;

wherein a downward slant surface is provided between the second slant surface and the transporter;

wherein a portion of the upper guide member is substantially parallel to the lower guide member at a point that is adjacent to the intersection of the first slant surface and said lower guide surface of the lower guide member;

wherein said second slant surface intersects said portion of the upper guide member that is substantially parallel to the lower guide member;

wherein an intersection of the downward slant surface and the second slant surface nearly intersects an extended plane of said lower guide surface of the lower guide member.

6. An image reading device according to claim 5, wherein the first slant surface is slanted upwardly toward the sub scanning direction.

* * * * *